United States Patent [19]
Sugiyama et al.

[11] Patent Number: 5,701,320
[45] Date of Patent: Dec. 23, 1997

[54] APPARATUS AND METHOD OF STABILIZING OSCILLATION FREQUENCY FOR SINGLE AXIAL MODE FREQUENCY TUNABLE LASER OSCILLATOR AND APPARATUS AND METHOD OF FREQUENCY SWEEPABLE LASER OSCILLATION

[75] Inventors: Akira Sugiyama, Ibaraki-ken; Tsuyoshi Nakayama, Kanagawa-ken; Masaaki Kato, Ibaraki-ken; Yoichiro Maruyama, Ibaraki-ken; Takashi Arisawa, Ibaraki-ken, all of Japan

[73] Assignee: Japan Atomic Energy Research Institute, Tokyo, Japan

[21] Appl. No.: 638,544

[22] Filed: Apr. 26, 1996

[30] Foreign Application Priority Data

Jun. 30, 1995 [JP] Japan ............................. 7-165954

[51] Int. Cl.$^6$ .......................................... H01S 3/13
[52] U.S. Cl. .................. 372/32; 372/29; 372/55; 372/58; 372/19
[58] Field of Search ................. 385/18, 19, 20, 385/26, 28, 29, 32, 55, 58, 59

[56] References Cited

U.S. PATENT DOCUMENTS

| | | | |
|---|---|---|---|
| 3,596,201 | 7/1971 | Chester | 372/32 X |
| 4,398,293 | 8/1983 | Hall et al. | 372/32 |
| 4,429,392 | 1/1984 | Yoshida et al. | 372/58 X |
| 4,573,159 | 2/1986 | Aagano et al. | 372/34 |
| 4,916,707 | 4/1990 | Rosenkranz | 372/38 |
| 4,947,398 | 8/1990 | Yasuda et al. | 372/29 |
| 5,063,568 | 11/1991 | Chiba et al. | 372/32 |
| 5,107,511 | 4/1992 | Nakatani et al. | 372/29 |
| 5,130,998 | 7/1992 | Wakata et al. | 372/32 |
| 5,387,974 | 2/1995 | Nakatani | 372/32 X |
| 5,438,578 | 8/1995 | Lee et al. | 372/32 |

OTHER PUBLICATIONS

Chikara Konagai and Toshio Satoh, Dye Laser Wavelength Control System for Uranium Isotope Separation, Jul. 7, 1994.

G. Bollen, H.J. Kluge and K. Wallmeroth, High-power pulsed dye laser with Fourier-limited bandwidth, J. Opt. Sco. Am. B, vol. 4, No. 3, Mar. 1987.

*Primary Examiner*—Brian Healy
*Attorney, Agent, or Firm*—Banner & Witcoff, Ltd.

[57] ABSTRACT

The compensation amount of the pressure for keeping the index of refraction of the gas constant is calculated on the basis of the pressures and the temperatures that have been measured at different time. Only the pressure of the gas will be varied in accordance with the calculated compensation value of the pressure, whereby the index of the gas can be maintained constant and the oscillation frequency can be kept constant as the consequence. The pressure corresponding to a desired sweeping oscillation frequency is also calculated using the measured pressures and temperatures. The pressure of the gas is varied on the basis of the result of calculation. Synchronously with the variation of the pressure of the gas, the cavity length and the angle of the frequency selecting element are compensated.

6 Claims, 5 Drawing Sheets

APPARATUS AND METHOD OF STABILIZING OSCILLATION FREQUENCY FOR SINGLE AXIAL MODE FREQUENCY TUNABLE LASER OSCILLATOR AND APPARATUS AND METHOD OF FREQUENCY SWEEPABLE LASER OSCILLATION

BACKGROUND OF THE INVENTION

1. Field of the Invention

The present invention relates to a method of and an apparatus for stabilizing the frequency of a single axial mode frequency tunable laser oscillator excited by a pulse laser as well as to a method of and an apparatus for laser oscillation capable of sweeping frequencies. The industrial field of utilization of the present invention is applicable to the fields of spectroscopy, optical measurement, photo-chemical reaction and the like.

2. Description of Prior Art

As a conventional method of controlling frequencies for a single axial mode dye laser oscillator to be excited by a high repetition pumping laser, a mechanical sweeping method has been employed as described in "Wavelength Control of Dye Laser System for Enriching Uranium" by Chikara Konagai and Toshio Satoh, ("Study of Laser" Vol. 22, No. 8, pp. 9–18, August, 1994) based on "Design Criteria and Operating Characteristics of a Single-Mode Pulsed Dye Laser" by A. F. Bernhardt and P. Rasmussen, ("Applied Physics" B26, pp. 141–146, 1981). The mechanical method is to stabilize a single axial mode (or stabilize an oscillation frequency) and sweep the frequency by synchronizing the frequency selection angles of the grating and the etalon which are components of a dye laser oscillator, with the cavity length.

However, according to this method, in order to determine the method of controlling the etalon and the control angle thereof, a feed-back loop according to a phase detection method employing a phase locked loop (PLL) by use of a lock-in amplifier is required. Furthermore due to the feed-back loop utilizing a lock-in amplifier, it takes time to stabilize the frequency and also the frequency sweeping time becomes slow.

According to "High-power pulsed dye laser with Fourier-limited bandwidth" by G. Bollen, H. J. Kluge and K. Wallmeroth (J. Opt. Soc. Am. B/Vol. 4, No. 3, March 1987, pp.329–336), a dye laser oscillation system is disclosed wherein the dye laser oscillator itself does not oscillate in a single axial mode but in a multiple mode, and takes up only a single axial mode by additionally narrowing the band width of frequencies by using an external etalon and attains oscillation of a single axial mode as a result. According to this system, a frequency sweeping method is employed to change the frequency by varying the pressure of the gas contained in the enclosed container in which the dye laser oscillator is disposed. Also, according to the system, stabilization of the frequency is performed by the external etalon with a narrow bandwidth. Since the reflectance of the external etalon having a narrow bandwidth is so large that the output transmitted through the external etalon becomes considerably small as compared to the laser output obtained by the dye laser oscillator. As a consequence, in order to have a larger output by the external etalon, the output of the dye laser oscillator has to be large. Accordingly, it is essential to have a high peak power as the pumping laser for driving the dye laser oscillator. However, it is generally almost impossible to oscillate a dye laser by using a high repetition rate pumping laser having a low peak power.

SUMMARY OF THE INVENTION

An object of the present invention is to provide an apparatus for and a method of stabilizing an oscillation frequency for a single axial mode frequency tunable laser oscillator which solve the various problems encountered in prior arts as described above and are simple in construction and economical, and capable of attaining high speed frequency sweeping.

Another object of the present invention is to provide an apparatus for and a method of laser oscillation capable of rapidly sweeping frequencies.

In accordance with the objects above, there is provided an apparatus for stabilizing an oscillation frequency provided by a frequency tunable laser oscillator which oscillates in a single axial mode and is disposed in the interior of an enclosed container containing a specified gas therein, said apparatus comprising: means for measuring the pressure and the temperature of said gas; means for calculating the pressure to be compensated for making the index of refraction of said gas constant, on the basis of the pressure and temperatures of said gas which have been measured by said measuring means at different times; and means for varying the pressure of said gas in accordance with the compensation value of the pressure which has been calculated by said calculating means.

In addition, there is provided a method of stabilizing an oscillation frequency provided by a frequency tunable laser oscillator which oscillates in a single axial mode and is disposed in the interior of an enclosed container containing a specified gas therein, said method comprising the steps of: measuring the pressure and the temperature of said gas; calculating the pressure to be compensated for making the index of refraction of said gas constant, on the basis of the pressures and temperatures of said gas which have been measured at different times; and varying the pressure of said gas in accordance with the compensation value of the pressure which has been calculated.

According to the apparatus for and the method of stabilizing the oscillation frequency provided by a single axial mode frequency tunable laser oscillator of the present invention, the compensation amount of the pressure for keeping the index of refraction of the gas constant is calculated on the basis of the pressures and the temperatures that have been measured by said measuring means at different time. Only the pressure of the gas is varied in accordance with the compensation amount of the pressure that has been thus calculated whereby the index of the gas can be maintained constant and the oscillation frequency can be kept constant as a consequence. Accordingly, the apparatus and method of the invention are simpler in constitution and more economical than a prior art which comprises a complicated loop such as phase detection method and the like and since phase detection method is not required, the frequencies can be stabilized in a shorter period of time than a prior art.

In accordance with the objects above, there is also provided a laser oscillation apparatus of the type of single axial mode frequency sweeping including an enclosed container containing a specified gas therein and a frequency tunable laser oscillator which oscillates in a single axial mode and is disposed in the interior of said container, said frequency tunable laser oscillator including a frequency selecting means having a grating therein, a beam expansion means, an oscillation medium means and an output coupling means, and having a cavity length to be defined by the length of the optical path between said grating and said output coupling means, said laser oscillation apparatus comprising: means for calculating in succession the pressure values and the indexes of refraction of said gas which correspond to desired sweeping oscillation frequencies; means for varying the pressure of said gas in accordance with the pressure values which have been calculated in succession by said calculating means; means for varying said cavity length so as to maintain a single axial mode, on the basis of the indexes of refraction of said gas which have been calculated in succession; and means for varying the angle of said frequency selecting means which is set with respect to said beam expansion means, in accordance with the indexes of refraction of the gas which have been calculated in succession, to compensate the variation of the angle of refraction of the laser beam of said beam expansion means which is caused by the variation of the pressure of said gas.

In addition, there is provided a method of sweeping the frequency in a single axial mode of a laser oscillation apparatus including an enclosed container containing a specified gas therein and a frequency tunable laser oscillator which oscillates in a single axial mode and is disposed in the interior of said container, said frequency tunable laser oscillator including a frequency selecting element having a grating therein, a beam expansion means, an oscillation medium means and an output coupling means, and having a cavity length to be defined by the length of the optical path between said grating and said output coupling means, said method comprising the steps of: calculating in succession the pressure values and the indexes of refraction of said gas which correspond to desired sweeping oscillation frequencies; varying the pressure of said gas in accordance with the pressure values which have been calculated in succession; varying said cavity length so as to keep a single axial mode, on the basis of the indexes of refraction of said gas which have been calculated in succession; and varying the angle of said frequency selecting means which is set with respect to said beam expansion means, in accordance with the indexes of refraction of the gas which have been calculated in succession, to compensate the variation of the angle of refraction of the laser beam of said beam expansion means which is caused by the variation of the pressure of said gas.

According to the laser oscillation apparatus of the type of single axial mode frequency sweeping and the method of sweeping the frequency thereof of the present invention, the pressure values and the indexes of refraction of the gas corresponding to desired sweeping oscillation frequencies are calculated in succession and the pressure of the gas is varied in accordance with the pressure values that have been calculated in succession. Furthermore, the cavity length is varied in accordance with the indexes of refraction of the gas that have been calculated in succession so as to maintain a single axial mode. Still furthermore, the angle of the frequency selecting means set with respect to the beam expansion means is varied in accordance with the indexes of refraction of the gas that have been calculated in succession, so as to compensate the variation of the angle of refraction of the laser beam in the beam expansion means as caused by the variation of the pressure of the gas. Accordingly, since a phase detection method as used in a prior art may be eliminated, frequency sweeping can be performed at a high speed.

BRIEF DESCRIPTION OF THE DRAWINGS

The above and other objects and features of the invention will become more obvious hereinafter from a consideration of the following description taken in connection with the accompanying drawings, wherein.

DESCRIPTION OF THE PREFERRED EMBODIMENTS

Figure 1:
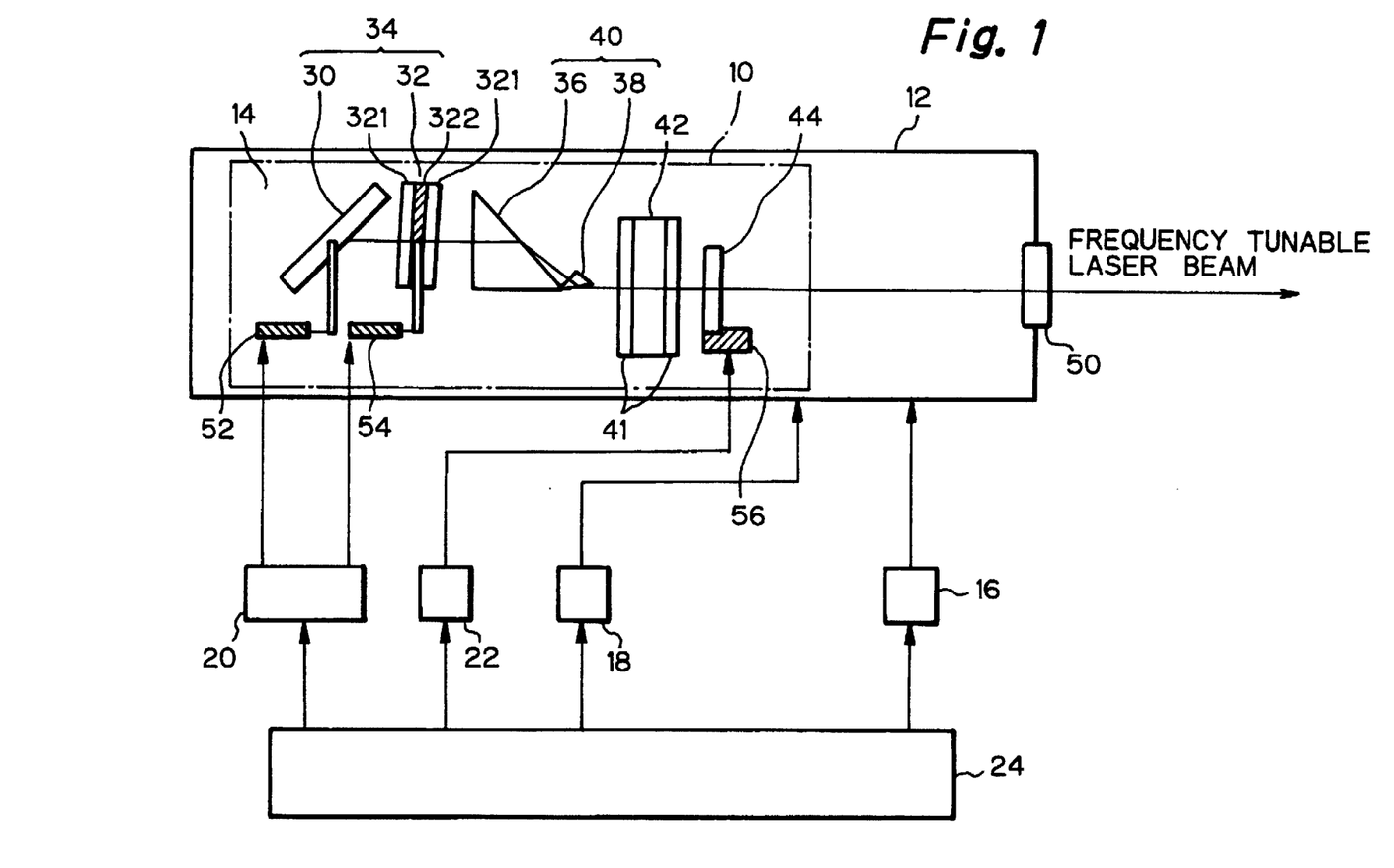
FIG. 1 schematically illustrates a constitution of a single axial mode frequency tunable laser oscillating apparatus according to an embodiment of the present invention.

In FIG. 1, the reference numeral 10 denotes a single axial mode laser oscillator, the numeral 12 a pressure container having an enclosed construction in which the single axial mode laser oscillator 10 is disposed, and the numeral 14 a gas contained in this pressure container 12. The term "gas" used herein is used generically to represent various sorts of gases including air and the like and in the present embodiment, air is used. Referring continuously to FIG. 1, the reference numeral 16 denotes a measuring section for the pressure and the temperature of the gas for measuring the pressure and the temperature of the gas 14 filled in the pressure container 12, the numeral 18 a pressure modulating section adapted to vary the pressure in the pressure container 12, the numeral 20 a driving section for a frequency selecting element adapted to drive a frequency selecting element for setting the frequency selection angle at an arbitrary angle, the numeral 22 a driving section for the cavity length adapted to vary the cavity length of a single axial mode laser oscillator 10 and the numeral 24 a personal computer for controlling the elements designated by the numerals 16 through 22. The personal computer 24 includes ROM adapted to store control programs for executing control work to be described later, RAM having a work area and a CPU for performing the control programs read out of the ROM.

A single axial mode laser oscillator 10 includes a frequency selecting element 34 including a grating 30 and an etalon 32, a beam expander 40 comprising two prisms 36 and 38, a laser oscillation medium 42 sandwiched at the opposite sides by glass sheets 41 and containing dye solution therebetween and an output coupler 44. The etalon 32 includes glass sheets 321 disposed at the opposite sides and a gas storage section 322 at the center for containing the gas. The gas storage section 322 is in communication with the external gas 14 so that the same gas as the external one 14 is stored therein.

The pressure container 12 is provided with a window 50 allowing the laser beam to be emitted outwardly therethrough. It is to be noted that the pressure container 12 is provided, though not shown, with a window for introducing a pumping light and a lens for converging the pumping light. Respectively to the grating 30 and the etalon 32, there are attached stepping motors 52 and 54 which are driven by the driving section 20 for the frequency selecting element to vary the angles respectively. To the output coupler 44, there is attached the piezoelectric driving element 56 which is driven by the driving section for cavity length 22 to move the output coupler 44 in the direction of the laser beam indicated by the arrow.

The respective elements designated by the reference numerals 30 through 44 are attached to the platform (not shown) made of super-Invar having a small coefficient of expansion in order to keep minimum the positional changes of these elements caused by the temperature variation in the environment in which the single axial mode laser oscillator 10 is to be arranged.

The pressure modulation section 18 comprises a stepping motor and a pressure cylinder to be driven by the stepping motor. The pressure cylinder is connected to the pressure container 12, and the internal pressure of the pressure cylinder is varied with the rotation of the shaft of the cylinder caused by the stepping motor. The driving section 20 for the frequency selecting element is adapted to drive the stepping motors 52, 54 attached respectively to the grating 30 and the etalon 32 in order to set the frequency selecting angles of these elements at arbitrary angles. The driving section 22 for the cavity length drives the piezoelectric driving element 56 to change the position of the output coupler 44 in order to vary the cavity length. The driving sections 20 and 22 for the frequency selecting element and the cavity length are required in the case of sweeping the laser oscillation frequencies.

Operation of stabilizing oscillation frequencies will first be explained. When the laser beam from the pumping laser (not shown) is incident on the laser oscillation medium 42 in the direction normal to the direction of the laser beam designated by the arrow, standing waves will be generated between the grating 30 and the output coupler 44 through the etalon 32, the beam expander 40 and the laser oscillation medium 42 to oscillate laser beam. The status of frequencies of the laser beam thus oscillated (or the axial mode) is dependent on the variation of the index of refraction of the gas in the pressure container 12. This index of refraction varies as the pressure and the temperature of the gas 14 vary. Accordingly, in order to inhibit shifting from the single axial mode to the multiple mode (in which a plurality of oscillation frequencies exist), namely to stabilize a single axial mode oscillation, even if the pressure and the temperature of the gas 14 may vary, it is only necessary to control the index of refraction to be constant. For this purpose, control is mode to keep the index of refraction constant by varying the pressure of the gas by use of the pressure modulation section 18 so as to offset the deviation from the initial status by successively comparing the indexes of refraction obtained by the personal computer 24.

More specifically, in case that the gas 14 is air like the present embodiment, the index of refraction of air may be given by the formula of Edlin as follows, provided that the content of carbon dioxide in the standard air is 10% and the pressure of the steam is 10 Torr.

$$\eta_{air} = 1 + 10^{-6} \times [0.015\{1/\lambda^2 - 3\}^2 + 1.593\{1/\lambda^2 - 3\} + \quad (1)$$

$$\{-0.385(P - 760) + T - 20\} \times \{-0.006(1/\lambda^2 - 3) - 0.932\} + 272.03],$$

where $\eta_{air}$ designates the index of refraction of air, $\lambda$ the wavelength (μm), P the pressure of air (torr) and T the temperature of air (°C.).

Since a wavelength is inversely proportional to an oscillation frequency, it can be seen from equation (1) that, if the index of refraction varies, the wavelength or the oscillation frequency will also vary.

It is also seen from equation (1) that the amount of variation of the index of refraction of the air due to variation of the pressure and the temperature of the gas may be given in the following equation.

$$\Delta\eta_{air} = \frac{\delta\eta_{air}}{\delta P} \Delta P + \frac{\delta\eta_{air}}{\delta T} \Delta T \quad (2)$$

For example, the index of refraction of air in the case of the wavelength being 570 nm will vary due to variation of the pressure as in the following equation.

$$\frac{\delta\eta_{air}}{\delta P} = 3.59 \times 10^{-7}/\text{Torr at 570 nm} \quad (3)$$

The index of refraction of air will also vary due to variation of the temperature as in the following equation.

$$\frac{\delta\eta_{air}}{\delta T} = -9.33 \times 10^{-7}/°C. \text{ at 760 Torr} \quad (4)$$

Then, in order to attain the variation in the pressure $\Delta P$ and the variation in the temperature $\Delta T$, the pressure and the temperature of the gas (or air) are measured by the measuring section 16 for the pressure and the temperature both in the case that the single axial mode laser oscillator 10 is oscillating in a desired frequency at a certain pressure and temperature of the gas (air) 14 and in the case that the pressure and the temperature of the gas (air) 14 have varied. Next, the variation in the index of refraction of the air $\Delta\eta_{air}$ is obtained from the variation in the pressure $\Delta P$ and the variation in the temperature $\Delta T$ which have been thus obtained and equation (2). The variation in the pressure $\Delta P$ required for offsetting with the variation in the index of refraction of air $\Delta\eta_{air}$ not by varying the temperature from the outside but by varying only the pressure from the outside may be obtained by substituting in equation (2) at the temperature being constant or $\Delta t=0$, the negative value of the variation in the index of refraction of the air $\Delta\eta_{air}$ which has been previously obtained.

The personal computer 24 calculates, in such a manner as mentioned above, the variation in pressure required to make the oscillation frequency constant, even if the pressure and the temperature of the gas (air) 14 may vary, by using the pressure and the temperature of the gas (air) which have been measured at the measuring section 16 for the pressure and the temperature of the gas. The pressure modulating section 18 is adapted to rotate the stepping motor in accordance with the variation in pressure thus calculated to drive a pressure cylinder (not shown in FIG. 1) so as to vary the pressure of the gas (air) 14 to a required amount of pressure variation. In this manner, the index of refraction of the gas may be controlled to be constant, whereby the oscillation frequency may be controlled to be constant. It is to be understood that the intervals of measurement of the pressure and the temperature by the measuring section 16 for the gas pressure and temperature may be, for example, intervals with a fixed time therebetween as governed by a clock signal to be output from the personal computer 24 or the pressure and/or temperature may be measured constantly and only accepted by the personal computer 24 only when a specified deviation with respect thereto is observed.

The apparatus for and the method of stabilizing oscillation frequencies according to the present invention including the measuring section 16 for the pressure and the temperature of the gas, the personal computer 24 and the pressure modulating section 18, as described above, are capable of stabilizing the frequency of a single axial mode laser at a more inexpensive cost and in a simpler manner, compared to use of a conventional mechanical sweeping method as explained above, and of stabilizing frequency in a shorter period of time than before owing to the phase detection method required by a prior art being not necessary.

Operation of sweeping oscillation frequencies will next be explained. In the case of sweeping oscillation frequencies, the angle compensation by the driving section 20 for a frequency selecting element and the cavity length compensation by the driving section 22 for the cavity length are executed in synchronization with variation of the pressure by the pressure modulation section 18 (conventional pressure sweeping method), whereby the oscillation frequencies may be varied while a single axial mode is kept.

Figure 2A:
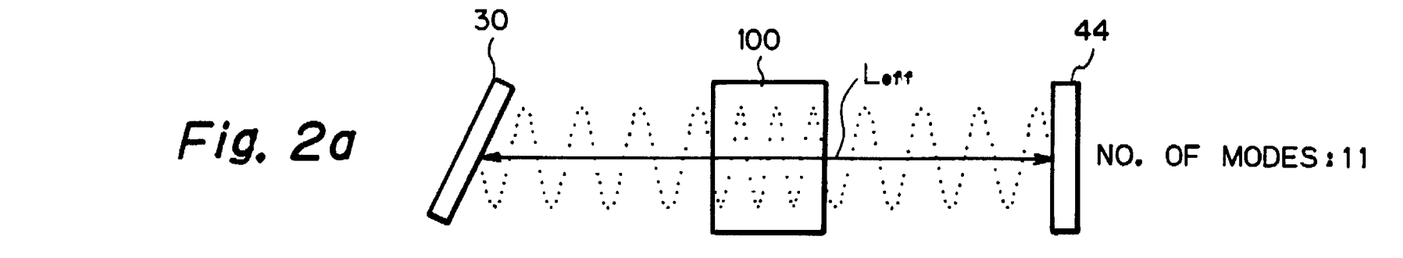
FIGS. 2a through 2c are conceptual drawings illustrating the manner of sweeping the oscillation frequencies for the purpose of explaining about compensation of cavity length.
Figure 2B:
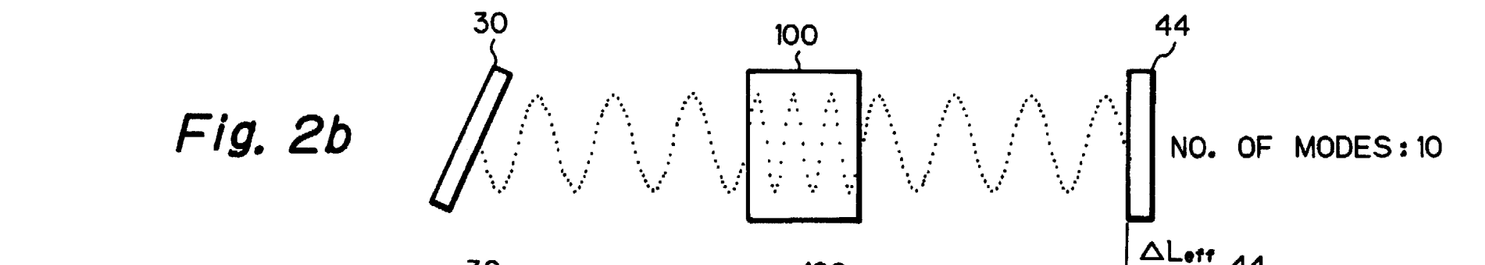
Figure 2C:
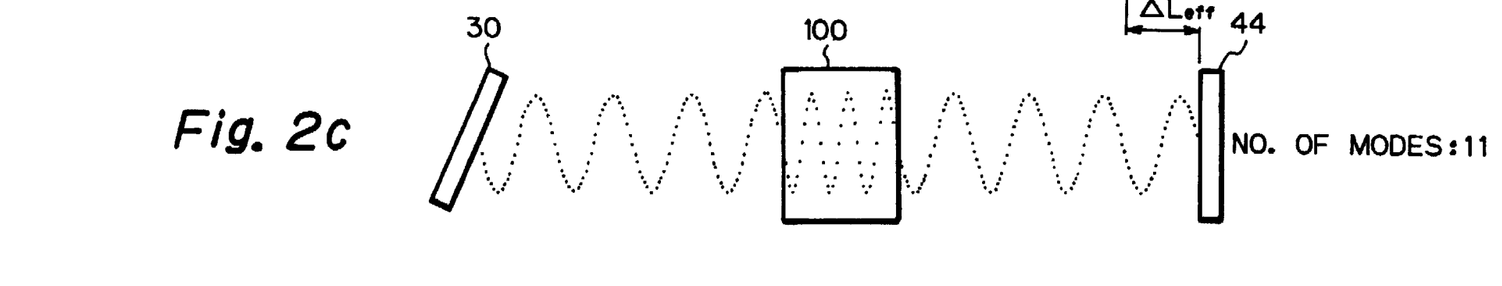

FIGS. 2a through 2c are conceptual drawings illustrating the manner of sweeping oscillation frequencies for the purpose of explaining about compensation of cavity length. Those reference numerals in FIGS. 2a through 2c same as those in FIG. 1 designate identical elements. The number of modes indicates the number of standing waves and one wave is defined as one cycle of the wave-shaped line. The effective cavity length $L_{eff}$ is the length obtained by converting the propagation length of the laser beam which passes through the respective optical elements in the laser resonator from the grating 30 to the output coupler 44 respectively shown in FIG. 1, into the value of the same in vacuum. The wave-shaped lines in FIGS. 2a through 2c show the standing waves in the laser oscillator 10. FIG. 2a shows an assumption that the initial condition of oscillation in a single axial mode with the number of modes being 11. The fixed section 100 encircled by a square corresponds to the total section comprising the whole of the glass portions represented by the numerals 321, 36, 38 and 41 in FIG. 1 and the laser oscillation medium 42, and the indexes of refraction of these sections are not dependent on the variation of the gas pressure. If the pressure alone is increased so as to sweep oscillation frequencies, the index of refraction of the portion of the laser oscillator filled with gas except that of the fixed section 100 alone increases, whereby the effective cavity length is extended as shown in FIG. 2b. It is to be noted, however, that extension of the effective cavity length realized by an increase in the pressure alone does not make it possible to keep the number of modes which represents the condition of laser oscillation frequency, at the initial number of 11 as explained later but makes it 10 which is decreased by 1. In order to execute frequency sweeping with the number of modes being 11 or the condition shown in FIG. 2a, i.e., the condition in which the initial single axial mode oscillation is being kept, it is necessary to compensate the cavity length by difference between the effective cavity length respectively shown in FIGS. 2c and 2b, which difference is required for the numeral of 11.

Variation of the selecting frequencies as caused by the variation of the pressures of the grating 30 and the etalon 32 constituting the frequency selection element 34 disposed in the single axial mode laser oscillator 10 may be expressed respectively as follows.

With regard to the grating 30, $$\Delta v_{Grating} = -\frac{C}{\lambda \eta_{air}} \frac{\delta \eta_{air}}{\delta P} \Delta P, \quad (5)$$

and with regard to the etalon 32, $$\Delta v_{Etalon} = -\frac{C}{\lambda \eta_{air}} \frac{\delta \eta_{air}}{\delta P} \Delta P, \quad (6)$$

where $v_{Grating}$ denotes the selecting frequency of the grating, $v_{Etalon}$ denotes the selecting frequency of the etalon and c denotes the speed of light. The other symbols are same as those already described earlier.

Since the wavelength at the grating and the etalon is identical, equations (5) and (6) are identical to each other. Therefore, under the same pressure conditions, the same variation in frequencies will result. For example, the value of such variation of the selecting frequencies with the wavelength being 570 nm and the temperature being 20° C. will be as follows.

$$\frac{\Delta v_{Grating}}{\Delta P} = \frac{\Delta v_{Etalon}}{\Delta P} = -185.5 \text{ MHz/Torr}, \quad (7)$$

where the value of the pressure variation per 1 GHz of the variation of the laser oscillation frequency will be approximately −5.4 Torr/GHz.

In the meantime, the variation of the oscillation frequency in an axial mode $v_{cavity}$ by a single axial mode laser oscillator 10 will be as follows.

$$\Delta v_{Cavity} = -\frac{C}{\lambda^2_{Cavity}} \left( \frac{\delta \lambda_{Cavity}}{\delta \eta_{air}} \frac{\delta \eta_{air}}{\delta P} \right) \Delta P \quad (8)$$

As indicated below, a difference arises between the variation of this axial mode oscillation frequency $\Delta v_{cavity}$ and the variations of the frequency by the frequency selecting elements, $\Delta v_{Grating}$ and $\Delta v_{Etalon}$.

The value of the variation of the oscillation frequency in this axial mode with the wavelength being 570 nm and the temperature being 20° C. will be as follows.

$$\frac{\Delta v_{Cavity}}{\Delta P} = -105.5 \text{ MHz/Torr} \quad (9)$$

The difference between the variation of the oscillation frequency in this axial mode or $\Delta v_{cavity}$=−105.5 MHz/Torr and the variation of the frequency by the frequency selecting elements or $\Delta v_{Grating} = \Delta v_{Etalon}$=−185.5 MHz/Torr changes the condition of the laser oscillation frequency from a single mode to a multiple mode. In order to avoid this change of modes, it is necessary to compensate the difference by changing the cavity length in accordance with the following equation.

$$\left( \frac{\Delta v_{Grating}}{\Delta P} - \frac{\Delta v_{Cavity}}{\Delta P} \right) \times \frac{\delta L_{eff}}{\delta v_{Cavity}} = 20.6 \text{ nm/Torr}, \quad (10)$$

where $L_{eff}$ is the effective cavity length and may be expressed by the following equation.

$$L_{eff} = \eta_{glass} L_{glass} + \eta_{air} L_{air} + \eta_{dye} L_{dye}, \quad (11)$$

where $L_{glass}$ denotes the length of the glass of the stationary section 100 or the length of the whole of the glass portions represented by the numerals 321, 36, 38 and 41 in FIG. 1. It is to be understood that this glass is generally made of silica. $L_{dye}$ denotes the length of the dye solution both in which the laser oscillation medium 42 in FIG. 1 is stored. $\eta_{glass}$ denotes the index of refraction of the silica glass and $\eta_{dye}$ designates the index of refraction of the dye solution.

As the result of calculation as above, the amount of the cavity length to be compensated is calculated as −110.0 nm per 1 GHz of frequency variation. It is to be noted that $\delta L_{eff}$ in equation (10) corresponds to $\Delta L_{eff}$ in FIGS. 2b and 2c.

Accordingly, in response to the variation of the pressure in the increase (or decrease) direction as indicated by the personal computer 24 for frequency sweeping, the stepping motor of the pressure modulation section 18 rotates to drive the pressure cylinder, whereby the pressure of the gas (air) 14 is increased (or decreased). With the increase (or decrease) of the pressure of the gas (air) 14, or synchronously with this, the drive section 22 for the cavity length responds to the variation of the pressure in the increase (or decrease) direction as indicated by the personal computer 24, to drive the piezoelectric driving element 56 to move thereby the output coupler 44 such that the effective cavity length is increased (or decreased) in accordance with equation (10).

Figure 3:
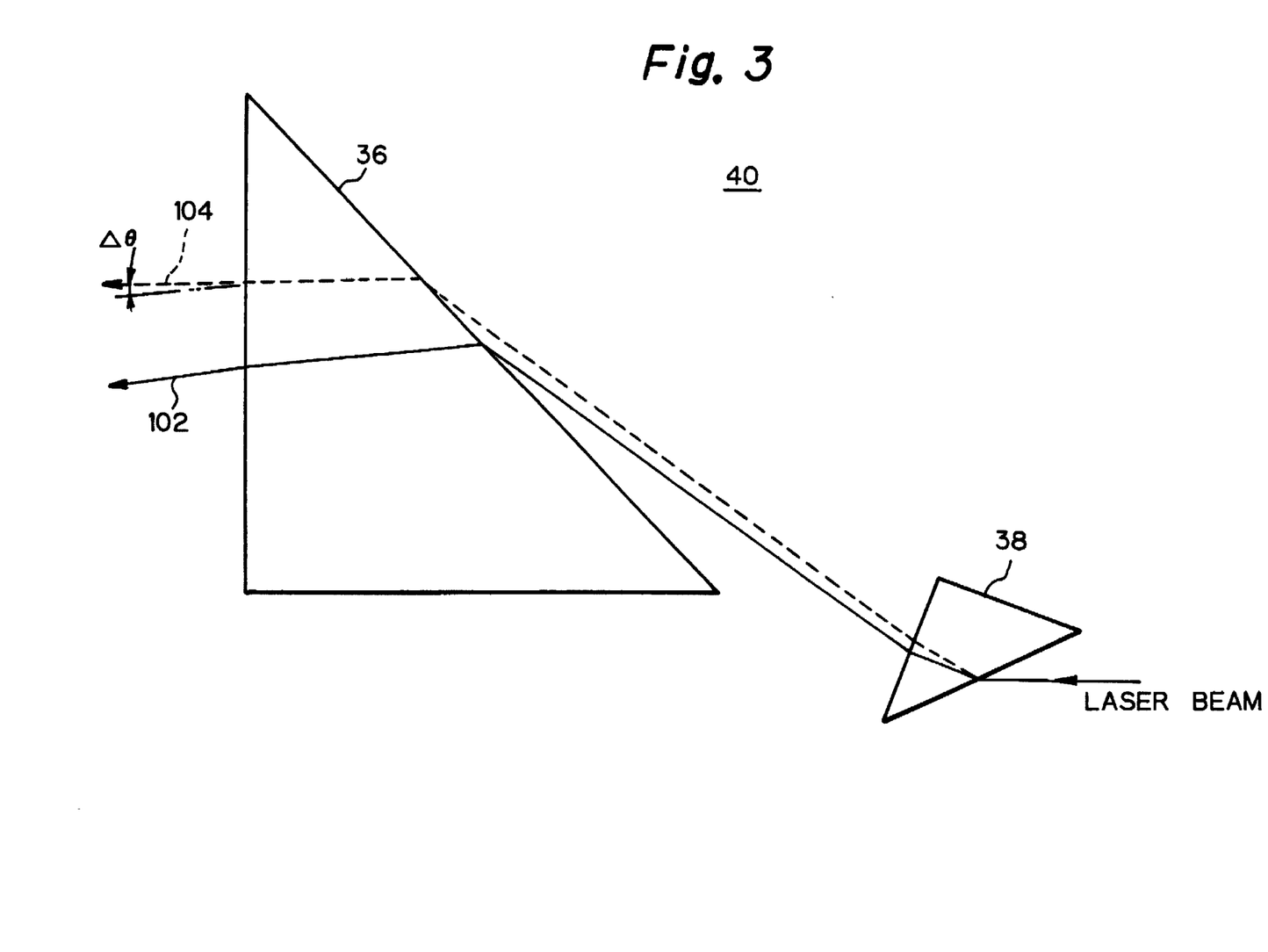
FIG. 3 illustrates the compensation of the oscillation frequency selecting angles of the grating and the etalon.

Compensation of the oscillation frequency selecting angle by the grating and the etalon will next be explained by using FIG. 3. Those reference numerals in FIG. 3 same as those in FIG. 1 designate identical elements.

This compensation is intended to offset the variation of the angles of refraction of the laser beam at the beam expander 40 caused by the variation of the pressures. The propagation directions of the beam which passes through the prisms 38, 36 are dependent on the ratio of the indexes of refraction of the glasses 38, 36 and the gas 14 which constitute the materials of the planes of incidence and outgoing. If the pressure for sweeping frequencies is varied, as earlier explained, the index of refraction of the gas 14 is also varied. As a result, the outgoing angle of the beam outgoing from the beam expander 40 will be different from the angle at the initial condition. The laser oscillation frequency which is selected by the grating and the etalon may also be varied by the angle of incidence of the beam incident on these elements. In FIG. 3, the solid line 102 indicates the initial propagation condition of the laser beam where sweeping of the oscillation frequencies is commenced while the dotted line 104 indicates an arbitrary condition during sweeping. The difference between these conditions at the outlet of the beam expander 40 is shown as $\Delta\theta$, which is the amount to the compensated. Since the variation of the outgoing angle of the beam from the beam expander 40 is same as the variation of the incident angles of the beam to the grating 30 and the etalon 32, the frequency selecting angle has to be compensated.

A required amount of angle compensation at the frequency selecting element 34 can be obtained in the following manner.

Snell's formula which expresses the angle of refraction of the beam passing through different media is as follows.

$$\eta_{air}\sin\theta_1 = \eta_{glass}\sin\theta_2, \quad (12)$$

where $\theta_1$ represents the angle of incidence and $\theta_2$ represents the angle of refraction, respectively.

From equation (12), the variation in the angle of refraction of the laser beam which has passed through the first prism 38 of the beam expander 40, as caused by the variation of pressure of the gas through which the laser beam passes may be expressed as in the following equation.

$$\frac{\delta\theta_{4(1st)}}{\delta\eta_{air}} = -\frac{\eta_{glass}^2}{2\eta_{air}^3}\left\{\sqrt{(1-X^2)}\cdot\left(X+\frac{\sin\theta_{1(1st)}}{\sqrt{2}}\right)\right\}^{-1}, \quad (13)$$

where X is expressed as follows.

$$X = \frac{1}{n_{air}\sqrt{2}}\left\{\sqrt{(\eta_{glass}^2-\eta_{air}^2\cdot\sin^2\theta_{1(1st)})} - \eta_{air}\cdot\sin\theta_{1(1st)}\right\}, \quad (14)$$

where $\theta_{1(1st)}$ represents the angle of incidence to the first prism 38 and $\theta_{4(1st)}$ represents the angle of refraction at the outgoing plane of the first prism 38, respectively.

Since the variation of these angles will cause a variation of the angle of incidence to the second prism 36, the following equation may be derived.

$$\frac{\delta\theta_{4(1st)}}{\delta\eta_{air}} = \frac{\partial\theta_{1(2nd)}}{\partial\eta_{air}}, \quad (15)$$

where $\theta_{1(2nd)}$ represents the angle of incidence to the second prism 36.

From these equations, the variation of the angle of refraction of the laser beam which has passed through the beam expander 40 (that is, has passed through the second prism 36), as caused by the variation of pressure of the gas through which the laser beam passes is obtained as follows.

$$\frac{\delta\theta_{4(2nd)}}{\delta\eta_{air}} = \frac{\delta\theta_{4(2nd)}}{\delta X}\cdot\frac{\delta X}{\delta\eta_{air}}, \quad (16)$$

$$\frac{\delta X}{\delta\eta_{air}} = \frac{\partial X}{\partial\theta_{1(2nd)}}\cdot\frac{\delta\theta_{4(1st)}}{\delta\eta_{air}} + \frac{dX}{d\eta_{air}}, \text{ and}$$

$$\frac{\delta\theta_{4(2nd)}}{\delta\eta_{air}} =$$

$$-\frac{1}{\sqrt{1-X^2}}\left[\frac{1}{\sqrt{2}}\left(\frac{\eta_{air}\cdot\sin\theta_{1(2nd)}\cdot\cos\theta_{1(2nd)}}{\sqrt{(\eta_{glass}^2-\eta_{air}^2\cdot\sin^2\theta_{1(2nd)})}} + \cos\theta_{1(2nd)}\right)\times\right.$$

$$\left.\frac{\delta\theta_{4(1st)}}{\delta\eta_{air}} + \frac{\eta_{glass}^2}{2\eta_{air}^3}\cdot\frac{1}{X+\frac{\sin\theta_{1(2nd)}}{\sqrt{2}}}\right],$$

where $\theta_{4(2nd)}$ represents the angle of refraction at the outgoing plane of the second prism 36.

From equation (16), the variation of the angle of refraction $\theta_{4(2nd)}$ at the outgoing plane of the second prism 36 will be obtained as follows.

$$\Delta\theta_{4(2nd)} = \frac{\delta\theta_{4(2nd)}}{\delta\eta_{air}}\Delta\eta_{air} \quad (17)$$

In the case that the wavelength is 570 nm and the temperature is 20° C., $\Delta\eta_{air}$ in equation (17) becomes as follows from the variation of the air pressure for the oscillation frequency of the laser beam of $-5.4$ Torr/GHz obtained from equation (17), and equation (3).

$$\Delta\eta_{air} = -1.9386\times10^{-6}/GHZ \quad (18)$$

whereby $$\Delta\theta_{4(2nd)} = 132 \, \mu deg./GHz \quad (19)$$

Therefore, so as to offset the variation of these angles caused at the beam expander 40 at the time of sweeping frequencies, it is necessary to compensate it by varying the angle of the frequency selecting element 34 relative to the beam expander 40.

More specifically, in response to the variation of the pressure in the direction of increase (or decrease) as indicated by the personal computer 24 for sweeping frequencies, the stepping motor of the pressure modulating section 18 rotates to drive the pressure cylinder, whereby the pressure of the gas (air) 14 is increased (or decreased). With the increase (or decrease) of the pressure of the gas (air) 14, or synchronously with this, the driving section 20 for the frequency selecting element responds to the variation of the pressure in the increase (or decrease) direction as indicated by the personal computer 24, to drive the stepping motors 52 and 54 to change thereby the respective angles of the grating 30 and the etalon 32 in accordance with equation (19).

It is to be understood that in the case of sweeping frequencies within such a short period of time as the temperature of the gas 14 may be kept constant, or if the oscillation frequency during sweeping may be decided only by the pressure of the gas 14, the measuring section 16 for the pressure and the temperature of the gas is not absolutely necessary and it is acceptable if the personal computer 24 calculates a required pressure corresponding to the sweeping frequency and provide the result of the calculation as appropriate to the pressure modulating section 18, the driving section 20 for the frequency selecting element and the driving section 22 for the cavity length.

However, in the case of slow sweeping, for example, sweeping of 1 GHz per hour, since the temperature of the gas 14 may vary, it is necessary to control the pressure modulating section 18 in consideration of this variation of the temperature. In such a case, the temperature of the gas 14 is measured during sweeping by the measuring section 16 for the pressure and the temperature of the gas and the pressure corresponding to a desired sweeping frequency is calculated by the personal computer 24 in addition to the variation of the temperature in a similar manner to stabilization of the oscillation frequencies as described earlier, whereby the pressure modulating section 18 is controlled. It is also possible to compensate the pressure corresponding to a desired sweeping frequency by using the pressure which has been measured by the measuring section 16 for the pressure and the temperature of the gas.

Figure 4:
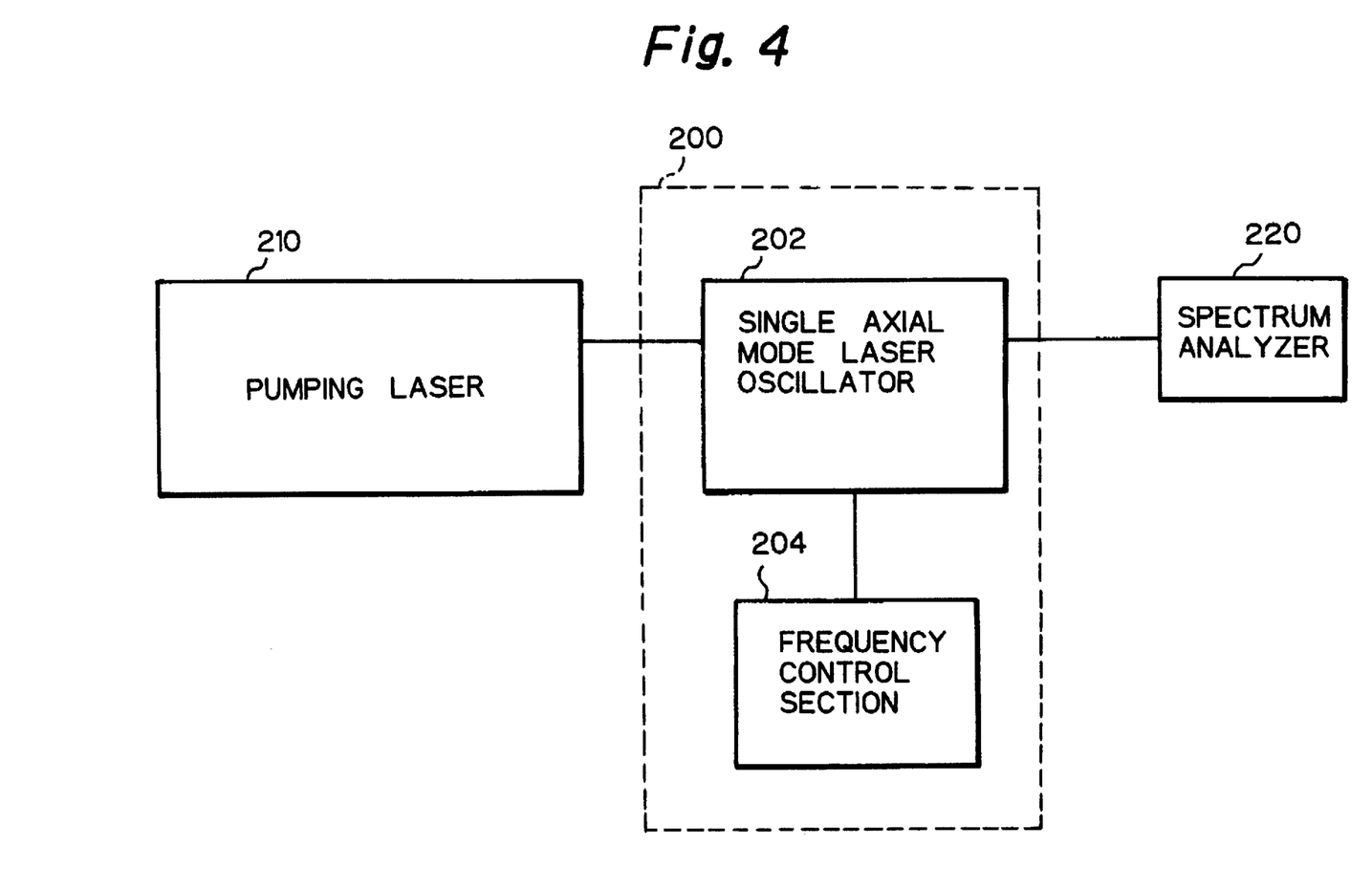
FIG. 4 illustrates a typical experimental arrangement for the embodiment shown in FIG. 1.

A typical experimental arrangement of the embodiment which has been constituted as above is illustrated in FIG. 4. The reference numeral 200 illustrates the entire single axial mode frequency tunable laser oscillation apparatus which is constituted as in FIG. 1, the numeral 202 the portion corresponding to the single axial mode laser oscillator 10 of FIG. 1, and the numeral 204 the portion for controlling the frequency of the laser beam which has been oscillated (numerals 16 through 24 and 52 through 56 in FIG. 1). In the experiment, Hänsch type single axial mode dye laser oscillator is employed as an oscillator. The reference numeral 210 designates the pumpinglaser which excites the Hänsch type single axial mode dye laser oscillator 202 and is a copper vapor laser having a low peak power and adapted to oscillate at a high frequency rate of 6.5 kHz. The reference numeral 220 denotes a spectrum analyzer for observing the frequency condition of the dye laser which has been oscillated by the Hänsch type single axial mode dye laser oscillator 202. Air is used as the gas contained in the resonator. The cavity length of the dye laser has been shortest possible so as to perform a single mode oscillation.

As a result of one hour observation, stabilization of the frequency turns out to be less than 100 MHz/hr. Furthermore, for frequency sweeping, it has been possible to vary the oscillation frequencies while a single axial mode is kept for a frequency band of approximately 30 GHz.

Figure 5:
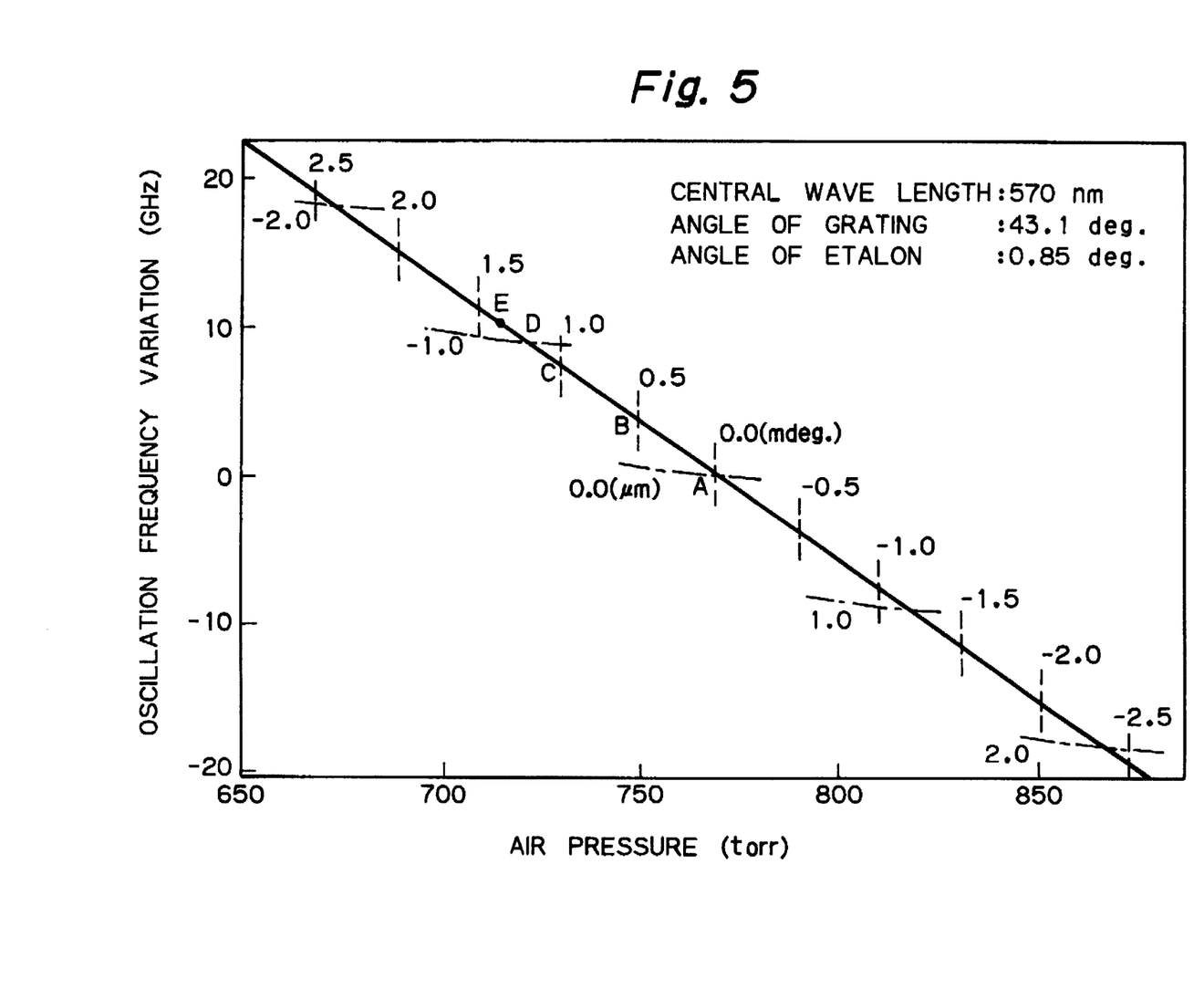
FIG. 5 illustrates the relation between the laser oscillation frequencies and three different control values (the variation of the pressure in a dye laser resonator, the compensated amount of the angles of the frequency selecting elements and the compensated amount of the cavity length).

The variation of the gas (air) pressure for the oscillation frequency of the dye laser, the compensated amount of the angle of the frequency selecting element and the compensated amount of the cavity length are illustrated respectively in FIG. 5. FIG. 5 illustrates the relation between the laser oscillation frequency and three different control values (the variation of the pressure in the dye laser resonator, the compensated amount of the angle of the frequency selecting element and the compensated amount of the cavity length). The solid line illustrates the relation between the laser oscillation frequency and the pressure of the air, provided that the air temperature is fixed on 25° C. in this case. The broken lines drawn vertically illustrate the compensated amount of the selecting angles of the grating and the etalon and alternate long and short dash lines drawn horizontally illustrate the compensated amount of the cavity length. The crossing point A at the center of the drawing defined by 760 torr, 0 m deg., and 0 μm represents the initial single axial mode oscillation when sweeping of frequencies is commenced. The condition at this crossing point A includes the central wavelength of 570 nm, the grating selecting angle of 43.1 degree, the etalon selecting angle of 0.85 degree, the air pressure of approximately 770 torr and the air temperature of 25° C. In order to execute frequency sweeping while maintaining an initial single axial mode oscillating condition, it is necessary to vary these three compensated amounts along the solid line synchronously with the variation of the pressure indicated by the solid line. For example, in keeping the temperature constant, in the case where sweeping is executed in the direction of increasing the oscillation frequency at the crossing point A by 10 GHz, at the point (B in the drawing) where the oscillation frequency is increased by approximately +3.7 GHz from the crossing point A, the air pressure is decreased to 750 torr, the selecting angles of the grating and the etalon are increased by 0.5 m deg., and the cavity length is decreased by approximately 0.4 μm. At the point (C in the drawing) where the oscillation frequency is increased by approximately +7.1 GHz from the crossing point A, the air pressure is decreased to approximately 730 torr, the selecting angles of the grating and the etalon are increased by 1.0 m deg., and the cavity length is decreased by approximately 0.8 μm. At the point (D in the drawing) where the oscillation frequency is increased by approximately +8.9 GHz, the air pressure is decreased to approximately 720 torr, the selecting angles of the grating and the etalon are increased by approximately 1.2 m deg., and the cavity length is decreased by 1.0 μm. At the point (E in the drawing) where the oscillation frequency is increased by approximately +10 GHz, the air pressure is decreased to approximately 715 torr, the selecting angles of the grating and the etalon are increased by approximately 1.3 m deg., and the cavity length is decreased by approximately 1.1 μm. In case of sweeping from the crossing point A to the point E where the oscillation frequency is increased by +10 GHz, in order to maintain a single axial mode oscillation, as the air pressure is decreased along the control curve in the drawing, the selecting angles of the grating and the etalon are continuously increased while the cavity length is continuously decreased. In the case that the temperature varies during sweeping, another solid line representing the relation between the air pressure and the oscillation frequency may be provided in the drawing with the temperature being used as the parameter, whereby the selecting angles of the grating and the etalon as well as the cavity length may be varied while varying the air pressure along the line taking the variation of the temperature in consideration.

As the result of measurements conducted in accordance with the methods as above described, the measurement values are found to coincide substantially with the calculated values as shown in the following table.

TABLE

| Compensation Operation | Calculated Value | Experimental Value |
| --- | --- | --- |
| Compensation of Frequency Selecting Angles | 132μ deg./GHz | 150 ± 20μ deg./GHz |
| Compensation of Cavity Length | −111.0 nm/GHz | −115.0 ± 5 nm/GHz |

The personal computer 24 calculates the pressures corresponding to the sweeping frequencies the succession in the intervals corresponding to a desired sweeping speed, calculates at the same time the index of refraction of the gas based on the calculated pressures, and further calculates the compensated amount of the required selecting angles of the grating and the etalon and the compensated amount of the cavity length, whereby the pressure modulating section 18, the driving section 20 for the frequency selecting element and the driving section 22 for the cavity length are driven in accordance with the respective values that have been obtained. In case that the temperature varies during sweeping, the pressure to be indicated to the pressure modulating section 18 is modified in the personal computer 24 by using the temperatures which have been measured by the measuring section 16 for the pressure and the temperature of the gas. Along with this, the compensated amount of the selecting angles of the grating and the etalon and the compensated amount of the cavity length are also modified. Furthermore, in order to enhance the accuracy of the sweeping frequencies, the pressure to be indicated as above may be compensated by using the pressure that has been measured by the measuring section 16 for the pressure and the temperature of the gas. Accordingly, the sweeping method according to the present embodiment is simpler in constitution, more economical and faster in response allowing a high speed sweeping of frequencies than a conventional method.

Although a Hänsch type resonator is employed in the experiment of the embodiment of the present invention, the present invention is not limited to application to such a resonator, but is applicable to any type of resonator such as a Littrow type (grazing incidence) resonator, etc., which may oscillate in a single axial mode.

What is claimed is:

1. An apparatus for stabilizing an oscillation frequency provided by a frequency tunable laser oscillator which oscillates in a single axial mode and is disposed in the interior of an enclosed container containing a specified gas therein, said apparatus comprising:

means for measuring the pressure and the temperature of said gas;

means for calculating the pressure to be compensated for making the index of refraction of said gas constant, on the basis of the pressure and temperatures of said gas which have been measured by said measuring means at different times; and means for varying the pressure of said gas in accordance with the compensation value of the pressure which has been calculated by said calculating means.

2. A laser oscillation apparatus of the type of single axial mode frequency sweeping including an enclosed container containing a specified gas therein and a frequency tunable laser oscillator which oscillates in a single axial mode and is disposed in the interior of said container, said frequency tunable laser oscillator including a frequency selecting means having a grating therein, a beam expansion means, an oscillation medium means and an output coupling means, and having a cavity length to be defined by the length of the optical path between said grating and said output coupling means, said laser oscillation apparatus comprising:

means for calculating in succession the pressure values and the indexes of refraction of said gas which correspond to desired sweeping oscillation frequencies;

means for varying the pressure of said gas in accordance with the pressure values which have been calculated in succession by said calculating means;

means for varying said cavity length so as to maintain a single axial mode, on the basis of the indexes of refraction of said gas which have been calculated in succession; and means for varying the angle of said frequency selecting means which is set with respect to said beam expansion means, in accordance with the indexes of refraction of the gas which have been calculated in succession, to compensate the variation of the angle of refraction of the laser beam of said beam expansion means which is caused by the variation of the pressure of said gas.

3. A laser oscillation apparatus as claimed in claim 2, further comprising means for measuring the pressure and the temperature of said gas, wherein said calculating means calculates in succession the pressure values and the indexes of refraction of said gas corresponding to desired sweeping oscillation frequencies, on the basis of said measured pressures and temperatures.

4. A method of stabilizing an oscillation frequency provided by a frequency tunable laser oscillator which oscillates in a single axial mode and is disposed in the interior of an enclosed container containing a specified gas therein, said method comprising the steps of:

measuring the pressure and the temperature of said gas;

calculating the pressure to be compensated for making the index of refraction of said gas constant, on the basis of the pressures and temperatures of said gas which have been measured at different times; and varying the pressure of said gas in accordance with the compensation value of the pressure which has been calculated.

5. A method of sweeping the frequency in a single axial mode of a laser oscillation apparatus including an enclosed container containing a specified gas therein and a frequency tunable laser oscillator which oscillates in a single axial mode and is disposed in the interior of said container, said frequency tunable laser oscillator including a frequency selecting element having a grating therein, a beam expansion means, an oscillation medium means and an output coupling means, and having a cavity length to be defined by the length of the optical path between said grating and said output coupling means, said method comprising the steps of:

calculating in succession the pressure values and the indexes of refraction of said gas which correspond to desired sweeping oscillation frequencies;

varying the pressure of said gas in accordance with the pressure values which have been calculated in succession;

varying said cavity length so as to keep a single axial mode, on the basis of the indexes of refraction of said gas which have been calculated in succession; and varying the angle of said frequency selecting means which is set with respect to said beam expansion means, in accordance with the indexes of refraction of the gas which have been calculated in succession, to compensate the variation of the angle of refraction of the laser beam of said beam expansion means which is caused by the variation of the pressure of said gas.

6. A method as claimed in claim 5, further comprising the step of measuring the pressure and the temperature of said gas, wherein the step of calculating includes calculating in succession the pressure values and the indexes of refraction of said gas corresponding to desired sweeping oscillation frequencies, on the basis of said measured pressures and temperatures.

* * * * *